US012577384B2

(12) United States Patent
Cavalieri et al.

(10) Patent No.: US 12,577,384 B2
(45) Date of Patent: Mar. 17, 2026

(54) POLYOLEFINS COMPOSITIONS OBTAINED FROM RECYCLED POLYOLEFINS

(71) Applicant: Basell Poliolefine Italia S.r.l., Milan (IT)

(72) Inventors: Claudio Cavalieri, Ferrara (IT); Mauro Treossi, Ferrara (IT); Marco Consalvi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 467 days.

(21) Appl. No.: 18/033,020

(22) PCT Filed: Oct. 25, 2021

(86) PCT No.: PCT/EP2021/079447
§ 371 (c)(1),
(2) Date: Apr. 20, 2023

(87) PCT Pub. No.: WO2022/090105
PCT Pub. Date: May 5, 2022

(65) Prior Publication Data
US 2023/0383110 A1      Nov. 30, 2023

(30) Foreign Application Priority Data

Oct. 28, 2020      (EP) ..................................... 20204419

(51) Int. Cl.
*C08L 23/12*          (2006.01)
(52) U.S. Cl.
CPC ......... *C08L 23/12* (2013.01); *C08L 2205/025* (2013.01); *C08L 2205/035* (2013.01); *C08L 2207/066* (2013.01); *C08L 2207/20* (2013.01)

(58) Field of Classification Search
CPC ......... C08L 2205/025; C08L 2205/035; C08L 2207/066; C08L 2207/20; C08L 23/04; C08L 23/10; C08L 23/12; C08L 23/14; C08L 53/00
See application file for complete search history.

(56) References Cited

U.S. PATENT DOCUMENTS

| | | | |
|---|---|---|---|
| 6,586,531 | B2 | 7/2003 | Washiyama et al. |
| 8,642,683 | B1 | 2/2014 | Dellock et al. |
| 11,708,484 | B2 | 7/2023 | De Palo et al. |
| 2003/0040583 | A1 | 2/2003 | Washiyama et al. |
| 2008/0167428 | A1 | 7/2008 | Massari et al. |
| 2020/0263013 | A1 | 8/2020 | De Palo et al. |

FOREIGN PATENT DOCUMENTS

| | | |
|---|---|---|
| CN | 102827424 A | 12/2012 |
| CN | 103030882 A | 4/2013 |
| CN | 104140594 A | 11/2014 |
| CN | 107686603 A | 2/2018 |
| CN | 108025826 A | 5/2018 |
| CN | 110372957 A | 10/2019 |
| CN | 110546198 A | 12/2019 |
| EP | 3165473 A1 | 5/2017 |
| JP | 2003268715 A | 9/2003 |
| JP | 2004510864 A | 4/2004 |
| JP | 2012516385 A | 7/2012 |
| JP | 2015518078 A | 6/2015 |
| JP | 2018532859 A | 11/2018 |
| KR | 20040005832 A | 1/2004 |
| WO | 2006067023 A1 | 6/2006 |
| WO | 2018206353 A1 | 11/2018 |
| WO | 2019224129 A1 | 11/2019 |

OTHER PUBLICATIONS

The International Search Report and The Written Opinion for PCT/EP2021/079447 mailed Feb. 24, 2022.

*Primary Examiner* — Ana L. Woodward

(57) ABSTRACT

A polypropylene composition made from or containing (a) recycled polypropylene, (b) recycled polyethylene (c) a polyolefin elastomer (POE) and (d) a polypropylene-containing composition.

14 Claims, No Drawings

POLYOLEFINS COMPOSITIONS OBTAINED FROM RECYCLED POLYOLEFINS

This application is the U.S. National Phase of PCT International Application PCT/EP2021/079447, filed Oct. 25, 2021, claiming benefit of priority to European Patent Application No. 20204419.4, filed Oct. 28, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to polyolefin compositions containing recycled polypropylene.

BACKGROUND OF THE INVENTION

In some embodiments, polyolefin compositions are used in injection-molded articles.

In some instances, polyolefin compositions raise concerns in terms of sustainability because the polyolefin compositions are produced from non-renewable sources.

In some instances and to mitigate the concerns, variable amounts of recycled polyolefins are used in multicomponent polyolefin compositions.

In some instances, the recycled polyolefin is derived from streams of post-consumer waste (PCW) material, which undergo separation from other polymers, such as PVC, PET or PS.

In some instances, there are challenges separating quantitatively polypropylene (PP) from polyethylene (PE) and vice-versa. In some instances and although named recycled PE (rPE) or recycled PP (rPP), commercially-available products from PCW sources are mixtures of PP and PE with the minor component reaching up to <50 wt %.

In some embodiments, additives and minor components in the recycled materials prevent the use of the recycled materials in certain applications, affect adversely mechanical, optical, and aesthetic properties, present challenges of compatibility between the main polymer phases during remolding, and induce perceptions of lower reliability of resulting articles.

SUMMARY OF THE INVENTION

In a general embodiment, the present disclosure provides a polypropylene composition made from or containing:
  (a) from 52 to 80 wt % of a recycled polypropylene (r-PP);
  (b) from 8 to 30 wt % of a recycled polyethylene;
  (c) from 4 to 20 wt % of a polyolefin elastomer (POE); and
  (d) from 3 to 12 wt % of a composition made from or containing
    i) from 20 to 90 wt % of a crystalline polypropylene component containing
      A1) from 25 to 75 wt % of a fraction A1 having a melt flow rate $MFR^I$ of from 0.5 to 10 g/10 min., and
      A2) from 75 to 25 wt % of a fraction A2 having a melt flow rate $MFR^{II}$, wherein the ratio $MFR^{II}/MFR^I$ is from 30 to 2000 and fractions A1 and A2 are independently selected from the group consisting of a propylene homopolymer, a random copolymer of propylene containing up to 8 wt % of ethylene, and a random copolymer of propylene containing up to 8 wt % of a C4-C10 α-olefin; and
    ii) from 10 to 80 wt % of a copolymer component of ethylene and a $C_3$-$C_{10}$ α-olefin, wherein the copolymer contains from 10 to 70 wt % of ethylene, optionally contains minor amounts of a diene, is soluble in xylene at room temperature, and has an intrinsic viscosity measured in tetrahydronaphthalene at 135° C. [η] of from 4 to 9 dl/g,
wherein the polypropylene composition has a melt flow rate (ISO 1133 230° C./2.16 kg) ranging from 8.0 to 30.0 g/10 min. and the percentages of (a), (b), (c), and (d) being referred to the total weight of the polypropylene composition.

DETAILED DESCRIPTION OF THE INVENTION

In some embodiments, the present disclosure provides a polypropylene composition made from or containing:
  (a) from 52 to 80 wt %, alternatively 55 to 75 wt %, alternatively 58 to 70 wt %, of a recycled polypropylene (r-PP);
  (b) from 8 to 30 wt % of a recycled polyethylene;
  (c) from 4 to 20 wt %, alternatively 5 to 18 wt %, alternatively from 6 to 15 wt % of, a polyolefin elastomer (POE); and
  (d) from 3 to 12 wt %, alternatively 4 to 10 wt %, alternatively from 5 to 8%, of a composition made from or containing
    i) from 20 to 90 wt % of a crystalline polypropylene component containing
      A1) from 25 to 75 wt % of a fraction A1 having a melt flow rate $MFR^I$ of from 0.5 to 10 g/10 min., and
      A2) from 75 to 25 wt % of a fraction A2 having a melt flow rate $MFR^{II}$, wherein the ratio $MFR^{II}/MFR^I$ is from 30 to 2000 and fractions A1 and A2 are independently selected from the group consisting of a propylene homopolymer, a random copolymer of propylene containing up to 8 wt % of ethylene, and a random copolymer of propylene containing up to 8 wt % of a C4-C10 α-olefin; and
    ii) from 10 to 80 wt % of a copolymer component of ethylene and a $C_3$-$C_{10}$ α-olefin, wherein the copolymer contains from 10 to 70 wt % of ethylene, optionally contains minor amounts of a diene, is soluble in xylene at room temperature, and has an intrinsic viscosity measured in tetrahydronaphthalene at 135° C. [η] of from 4 to 9 dl/g,
wherein the polypropylene composition has a melt flow rate (ISO 1133 230° C./2.16 kg) ranging from 8.0 to 30.0 g/10 min., alternatively from 10.0 to 25.0 g/10 min., alternatively from 12.0 to 20.0 g/10 min., and the percentages of (a), (b), (c), and (d) being referred to the total weight of the polypropylene composition.

As used herein, the term "copolymer" refers to polymers with two different recurring units as well as to polymers with more than two different recurring units, such as terpolymers, in the chain. As used herein, the terms "ambient temperature" and "room temperature" refer to a temperature of 25° C.

As used herein, the term "crystalline polypropylene" refers to a propylene polymer having an amount of isotactic pentads (mmmm), measured by $^{13}$C-MNR on the fraction insoluble in xylene at 25° C., higher than 70 molar %. As used herein, the term "elastomeric" polymer refers to a polymer having solubility in xylene at ambient temperature higher than 50 wt %.

In some embodiments, the features of the components forming the polypropylene composition are not inextricably linked to each other. Accordingly, a level of the features involves the same level or a different level of the remaining features of the same or different components. In some embodiments, components (a) to (d), the optional additional components, and features of components (a) to (d) are combined in various combinations.

In some embodiments, the r-PP component (a) is made from or containing plastic waste of post-industrial or post-consumer origin. In some embodiments, the r-PP component (a) originates from post-consumer waste (PCW) PP packaging waste. In some embodiments, the post-consumer waste (PCW) PP packaging waste is made from containing detergent and shampoo bottles, dairy pots, and meat trays. In some embodiments, the PP raw material waste is pre-sorted by waste management companies. In some embodiments, the 3 PP source is waste material collected under the DSD324 (05-2012) and DSD324-1 standard (02-2016). In some embodiment, optical sorting is used to remove unwanted polymers. In some embodiments, polystyrene or polyethylene (PE) contamination in the feed occurs, thereby preventing the use of polypropylene as the sole polymer component of the composition.

PP is available in three different families of products, PP homopolymers (PPh), PP random copolymer (PPr), and PP impact copolymer (or heterophasic PP copolymer, PPc).

In some embodiments, the waste material is characterized as originating from the following sources: (a) extrusion sheet and film material; and (b) injection molded material. In some embodiments, the extrusion sheet and film material are made from or containing PP homopolymers (PPh) and PP random copolymers (PPr). In some embodiments, the extrusion and film material are free of rubber. In some embodiments, the extrusion sheet and film material are made from or containing biaxially-oriented polypropylene (BOPP). In some embodiments, the injection-molded material is made from or containing a mixture of PP homopolymer (PPh), PP random copolymers (PPr), PP impact copolymer (PPc), and about 15 wt % rubber.

In some embodiments, the recycled PP component is made from or containing half packaging material (BOPP) and half rubber-containing injection-molded material. In some embodiments, the injection-molded material contains rubbers selected from the group consisting of C2-C3 rubber, thermoplastic elastomers (TPE), ethylene propylene diene monomers (EPDM), and ethylene propylene rubber (EPR).

In some embodiments, the recycled PP component (a) is made from or containing a rubber content of between 1.5-12 wt %, wherein wt % is relative to the total amount of the recycled PP. In some embodiments, the rubber is provided by a rubber-containing injection-molded material. In some embodiments, the recycled PP component (a) is made from or containing between 25-75 wt % BOPP and between 25-75 wt % rubber-containing injection-molded material, wherein wt % is relative to the total amount of recycled PP.

In some embodiments, the recycled PP component (a) is between 55 to 75 wt %, alternatively 58 to 70 wt % of the polypropylene composition, wherein wt % is relative to the total weight of the polypropylene composition.

In some embodiments, the melt flow rate (ISO 1133 230° C./2.16 kg) of the recycled PP ranges from 5 to 150 g/10 min., alternatively from 8 to 120 g/10 min., alternatively from 40 to 100 g/10 min.

In some embodiments, the polymer component (b) is made from or containing recycled PE (rPE). In some embodiments, the recycled PE is made from or containing PE waste collected from various sources. In some embodiments, the sources are selected from the group consisting of PE bottles, PE vessels having a volume of 5 liters or more and being cleaned in accordance with environmental specifications, and PE extrusion pipes. In some embodiments, the recycled PE is made from or containing recycled High-Density Polyethylene (HDPE) to at least 90 wt %, alternatively at least 92 wt %, alternatively at least 95 wt %.

In some embodiments, contaminants are removed from recycled PE by a plurality of steps. In some embodiments, the steps are selected from the group consisting of cleaning steps, washing steps, and sorting steps. In some embodiments, the PE recyclate is made from or containing 0-6 wt %, alternatively between 1-5 wt %, alternatively between 3-4.5 wt %, of polypropylene and up to 1 wt % of polystyrene contaminants, wherein wt % is relative to the total amount of recycled PE.

In some embodiments, the recycled PE has a density in the range of approximately 0.94-0.97 g/cm$^3$.

In some embodiments, the MFR of the recycled PE (2.16 kg, 190° C.) is in the range of 0.1-5 g/10 min., alternatively in the range 0.1-0.5 g/10 min., thereby providing a polymer composition for blow molding materials. In some embodiments, the recycled PE has a MFR 2.16 kg, 230° C. of between 0.4-0.9 g/10 min., alternatively between 0.45-0.85 g/10 min.

In some embodiments, the recycled PE is present between 10-25 wt %, alternatively between 15-23 wt %, wherein wt % is relative to the total weight of the polypropylene composition.

In some embodiments, component (c) is made from or containing a polyolefin elastomer (POE), which is an ethylene-alpha-olefin copolymer. In some embodiments, the POE is selected from the group consisting of C$_2$-C$_4$ copolymers, C$_2$-C$_6$ copolymers, and C$_2$-C$_8$ copolymers.

In some embodiments, the POE is a C$_2$-C$_6$ copolymer or a C$_2$-C$_8$ copolymer. In some embodiments, the POE contains from 70-80 wt % ethylene, alternatively between 73-78 wt %, alternatively between 74-77 wt %; wherein wt % ethylene is relative to the total weight of the POE.

In some embodiments, the POE is made from or containing an ethylene (C2) octene (C8) elastomer obtained with a single site transition metal compound based catalyst.

In some embodiments, the POE has a density of between 0.85-0.89 g/cm$^3$, alternatively between 0.855-0.885 g/cm$^3$, alternatively between 0.86-0.875 g/cm$^3$.

In some embodiments, the POE has an MFR of between 0.3-1 g/10 min., alternatively between 0.4-0.7 g/10 min., alternatively between 0.45-0.6 g/10 min., (190° C., 2.16 kg).

In some embodiments, the POEs are commercially available under the tradenames Infuse 9107, Infuse 9077, and Engage XLT8677 from The Dow Chemical Company.

In some embodiments, the POE is between 4 to 20 wt %, alternatively 5 to 18 wt %, alternatively from 5 to 8 wt %, with respect to the total weight of the polypropylene composition.

In some embodiments, component (d) contains (i) a crystalline polypropylene component and (ii) a copolymer component. In some embodiments, the crystalline polypropylene component (i) ranges from 20 to 90 wt %, alternatively 30 to 80 wt %, alternatively 50 to 80 wt %, of the total weight of component (c). In some embodiments, copolymer component (ii) is ranges from 80 to 10 wt %, alternatively 70 to 20 wt %, alternatively 50 to 20 wt %, of the total weight of component (c). The sum of the percentage amounts of the components is equal to 100 percent.

In some embodiments, the fractions A1 and A2, which form crystalline polypropylene component (i), are selected from the group consisting of propylene homopolymers, random copolymers of propylene containing up to 8 wt % of ethylene, and random copolymers of propylene containing up to 8 wt % of a $C_4$-$C_{10}$ α-olefin which conforms to the formula CH2=CHR and wherein R is a linear or branched alkyl $C_1$-$C_8$ radical or an aryl radical. In some embodiments, the random copolymers of propylene and ethylene contains 0.2 to 5 wt % of ethylene. In some embodiments, the random copolymer of propylene and the $C_4$-$C_{10}$ α-olefin contains 1 to 8 wt % of the $C_4$-$C_{10}$ α-olefin. In some embodiments, the aryl radical is phenyl. In some embodiments, the $C_4$-$C_{10}$ α-olefin is selected from the group consisting of 1-butene, 1-pentene, 1-hexene, 4-methyl-1-pentene, and 1-octene. In some embodiments, the $C_4$-$C_{10}$ α-olefin is 1-butene.

In some embodiments, the fractions A1 and A2 differ from each another in average molecular weight, as described by melt flow rate. In some embodiments, fraction A1 has a comparably higher molecular weight (lower melt flow rate MFRI of from 0.5 to 10 g/10 min.) than fraction A2. As such, fraction A2 has a comparably lower molecular weight (higher melt flow rate). This relationship is defined by the ratio $MFR^{II}/MFR^I$. In some embodiments, the ratio $MFR^{II}/MFR^I$ ranges from 30 to 2000, alternatively 40 to 2000, alternatively 50 to 1000, alternatively 60 to 500.

In some embodiments, the content of polymer, which is insoluble in xylene at room temperature for fractions A1 and A2, is not less than 80 wt %, alternatively not less than 85 wt %, alternatively not less than 90 wt %. In some embodiments and for propylene homopolymers, the content of polymer, which is insoluble in xylene at room temperature, is not less than 90 wt %, alternatively not less than 95 wt %, alternatively not less than 97 wt %, based on the weight of the fraction.

In some embodiments, component (ii) is a copolymer component containing from 10 to 70 wt % of ethylene, a $C_3$-$C_{10}$ α-olefin having the formula $CH_2$=CHR, wherein R is a linear or branched $C_1$-$C_8$ alkyl radical or an aryl radical, and optionally a minor amount of a diene. In some embodiments, the aryl radical is phenyl. In some embodiments, the ethylene content of the copolymer component ranges 15 to 60 wt %, alternatively 15 to 50 wt %.

In some embodiments, the $C_3$-$C_{10}$ α-olefins are selected from the group consisting of propylene, 1-butene, 1-pentene, 1-hexene, 4-methyl-1-pentene, and 1-octene. In some embodiments, the $C_3$-$C_{10}$ α-olefins are selected from the group consisting of propylene and 1-butene. In some embodiments, the dienes are selected from the group consisting of butadiene, 1,4-hexadiene, 1,5-hexadiene, and ethylidene-norbonene-1. In some embodiments, the diene is present in an amount of 0.5 to 10 wt %, with respect to the weight of the copolymer component (ii).

In some embodiments, the copolymer component (ii) is soluble in xylene at room temperature and has an intrinsic viscosity [n] in tetrahydronaphthalene at 135° C. of from 4 to 9 dl/g, alternatively 5 to 8 dl/g, alternatively 5.5 to 7 dl/g.

In some embodiments, the melt flow rate of the component (d) ranges from 0.1 to 40 g/10 min., alternatively from 0.3 to 15 g/10 min., alternatively from 0.5 to 10 g/10 min.

In some embodiments, component (d) is prepared by mechanically blending components (i) and (ii) or via sequential polymerization as described in U.S. Pat. No. 6,586,531 B2, incorporated by reference.

In some embodiments, an inorganic filler is present as a further component (e). In some embodiments, the filler is selected from the group consisting of talc, fiber glass, $CaCO_3$, clays, carbon black, and mica. In some embodiments, the filler is talc. In some embodiments, the talc is unmodified. In some embodiments, the talc does not have a surface coating or surface treatment. In some embodiments, the talc has an average particle size smaller than 5 μm.

In some embodiments, the filler derives in total or in part from the filler present in recycled components of the composition. In some embodiments, the filler is added as a fresh filler in the preparation of the polypropylene composition.

In some embodiments, component (e) is present in an amount ranging from 2 to 4 wt %, based on the total weight of polypropylene composition.

In some embodiments, the optional component (f) is a SEBS rubber.

In some embodiments, the SEBS rubbers are (partly) hydrogenated styrene-butadiene-styrene block copolymers. In some embodiments, the SEBS rubbers belong to the family of styrenic block copolymers (SBC) and are triblock copolymers, having styrene at both extremities of the polymer chain with an internal polybutadiene, polyisoprene or hydrogenated polybutadiene or polyisoprene block.

In some embodiments, the SEBS copolymers are commercially available under the tradenames of Kraton and Tuftec. In some embodiments, the SEBS copolymers are commercially available under the tradename of Kraton SEBS G1657MS.

In some embodiments, the SEBS is present between 0.1-4 wt %, alternatively between 0.2-3 wt %, based on the total weight of polypropylene composition.

In some embodiments, the polypropylene composition is further made from or containing an additive package. In some embodiments, the polypropylene composition is further made from or containing between 0.05-10 wt %, alternatively 0.1-8 wt %, of additives, based on the total weight of the polypropylene composition.

In some embodiments, the additives are selected from the group consisting of polyethylenes, maleic anhydride grafted PEs (PEMA), maleic anhydride grafted PPs (PPMA), stabilizers, peroxides, calcium oxides (CaO), colorants, and stripping agents. In some embodiments, the additives are polyethylenes selected from the group consisting of virgin HDPE and recycled HDPE.

In some embodiments, the PE is selected from the group consisting of High-Density PE (HDPE), Low-Density PE (LDPE), and Linear Low-Density PE (LLDPE).

In some embodiments, a PP compatible acid having a polar group is added to the polypropylene composition. In some embodiments, the PP compatible acid having a polar group is a PPMA.

In some embodiments, the polypropylene composition is further made from or containing an additive selected from the group consisting of PEMA, PE, and PPMA, in an amount between 0.1-2 wt %, alternatively between 0.2-1 wt %, alternatively between 0.4-0.8 wt %, based upon the total weight of the polypropylene composition.

In some embodiments, the polypropylene composition is further made from or containing a stabilizer. In some embodiments, the stabilizer is added via a masterbatch. In some embodiments, the masterbatch is Tosaf ME 833848, which is a blend of about 70 wt % LDPE with a phenolic stabilizer (Irganox B225) and an Irgafos. In some embodiments, the masterbatch is added in an amount between 0.2 and 1.5 wt %, alternatively between 0.3 and 1.2 wt %, based upon the total weight of the polypropylene composition.

In some embodiments, the polypropylene composition is further made from or containing a peroxide. In some embodiments, the peroxide is added in the form of an organic compound or via a masterbatch. In some embodiments, the peroxide improves the flow of the polypropylene composition.

In some embodiments, the peroxide is selected from the group consisting of Zebraflow T028, Zebraflow T0214, and Zebraflow T0318, which are masterbatches of a peroxide with a polyolefin. In some embodiments, the peroxide is 2-10 wt % of the additive package.

In some embodiments, the polypropylene composition is further made or containing CaO, thereby inhibiting the release of HCl. In some embodiments, the CaO is added as a masterbatch. In some embodiments, the masterbatch is made from or containing LDPE. In some embodiments, the CaO is added in a range between 0-2 wt %, based upon the total weight of the polypropylene composition.

In some embodiments, the polypropylene composition is further made from or containing a black colorant in an amount between 0.1-5 wt %, alternatively between 1-2 wt %, in the form of a masterbatch blend, based upon the total weight of the polypropylene composition.

As used herein, the term "stripping agents" refers to compounds used to remove volatiles during processing of the polypropylene composition. In some embodiments, the stripping agent is available commercially under the tradename BYK 4200.

In some embodiments, the package of additives ranges from 0.5 to 7% wt, alternatively from 1 to 6% wt, based on the total amount of the polypropylene composition.

In some embodiments, the present disclosure provides a polypropylene composition made from or containing:

(a) from 52 to 80 wt %, alternatively 55 to 75 wt %, alternatively 58-70 wt %, of a recycled polypropylene (r-PP);

(b) from 8 to 30 wt % of a recycled polyethylene;

(c) from 4 to 20 wt %, alternatively 5 to 18 wt %, alternatively from 6 to 15 wt % of a polyolefin elastomer (POE);

(d) from 3 to 12 wt %, alternatively 4 to 10 wt %, alternatively from 5 to 8%, of a composition made from or containing i) from 20 to 90 wt % of a crystalline polypropylene component containing A1) from 25 to 75 wt % of a fraction A1 having a melt flow rate $MFR^I$ of from 0.5 to 10 g/10 min., and A2) from 75 to 25 wt % of a fraction A2 having a melt flow rate $MFR^{II}$, wherein the ratio $MFR^{II}/MFR^I$ is from 30 to 2000 and fractions A1 and A2 are independently selected from the group consisting of a propylene homopolymer, a random copolymer of propylene containing up to 8 wt % of ethylene, and a random copolymer of propylene containing up to 8 wt % of a $C_4$-$C_{10}$ α-olefin; and ii) from 10 to 80 wt % of a copolymer component of ethylene and a $C_3$-$C_{10}$ α-olefin, wherein the copolymer contains from 10 to 70 wt % of ethylene, and optionally contains minor amounts of a diene, is soluble in xylene at room temperature, and has an intrinsic viscosity measured in tetrahydronaphthalene at 135° C. [11] of from 4 to 9 dl/g; and from 0.05 to 10 wt %, alternatively 0.1-8 wt %, of additives, wherein the polypropylene composition has a melt flow rate (ISO 1133 230° C./2.16 kg) ranging from 8.0 to 30 g/10 min., alternatively from 10 to 25 g/10 min., alternatively from 12 to 20 g/10 min. and the percentages of (a), (b), (c), (d), and the additives being referred to the total weight of polypropylene composition.

In some embodiments, the polypropylene composition has a Flexural modulus ranging between 800-1400 MPa, alternatively between 810-1300 MPa.

In some embodiments, the polypropylene composition has a Charpy impact strength at 23° C. of 50-100 kJ/m², alternatively between 40-80 kJ/m². In some embodiments, the Charpy impact strength at −20° C. ranges from 5 to 20 kJ/m², alternatively from 6 to 15 kJ/m².

In some embodiments, the polypropylene composition has a tensile strength at yield equal to or higher than 15 MPa, an elongation at yield equal to or higher than 10%, and a tensile strength at break equal to or higher than 10 MPa.

In some embodiments, the polypropylene composition is obtained by mechanical blending of the components (a)-(d) and optionally further components and additives.

In some embodiments, the polypropylene composition is obtained using a co-rotating twin screw tandem extruder to which the components (a-d) and optionally further components and additives are added.

In some embodiments, the additives are added in a reclaim extruder (first extruder) and a compounding extruder (second extruder) of a tandem extruder.

In some embodiments, the polypropylene composition is provided in granule or flake form.

In some embodiments, the polypropylene composition is used to prepare boxes, trays, suitcases, or consumer goods.

In some embodiments, the articles made from the polypropylene composition are formed by injection molding or blow-molding.

The following examples are given to illustrate, but not limit the present disclosure.

EXAMPLES

Characterizations
Xylene-Soluble (XS) Fraction at 25° C.

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid was poured into a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) were calculated by using the formula:

$$XStot = WaXSA + WbXSB + WcXSC$$

wherein Wa, Wb and We were the relative amount of components A, B and C, respectively, and (A+B+C=1).

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Polydispersity Index:

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus, the polydispersity index was determined using the equation:

$$P.I.=105/Gc$$

wherein Gc is the crossover modulus which is defined as the value (expressed in Pa) at which G'=G" wherein G' is the storage modulus and G" is the loss modulus.

Ethylene (C2) Content $^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal standard at 29.9 ppm. The samples were dissolved in 1,1,2,2-tetrachloroethane-d2 at 120° C. with an 8% wt/v concentration. Each spectrum was acquired with a 900 pulse, 15 seconds of delay between pulses and CPD, thereby removing 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

PPP = 100 $T_{\beta\beta}$/S    PPE = 100 $T_{\beta\delta}$/S    EPE = 100 $T_{\delta\delta}$/S
PEP = 100 $S_{\beta\beta}$/S    PEE = 100 $S_{\beta\delta}$/S    EEE = 100 (0.25 $S_{\gamma\delta}$ + 0.5 $S_{\delta\delta}$)/S
S = $T_{\beta\beta}$ + $T_{\beta\delta}$ +
$T_{\delta\delta}$ + $S_{\beta\beta}$ +
$S_{\beta\delta}$ + 0.25 $S_{\gamma\delta}$ +
0.5 $S_{\delta\delta}$ The molar percentage of ethylene content was evaluated using the following equation:

$$E \% \ mol=100*[PEP+PEE+EEE]$$

The weight percentage of ethylene content was evaluated using the following equation:

$$E \% \ wt. = \frac{100 * E\% \ mol * MW_E}{E\% \ mol * MW_E + P\% \ mol * MW_P}$$

where P % mol is the molar percentage of propylene content, while $MW_E$ and $MW_P$ are the molecular weights of ethylene and propylene, respectively.

The product of reactivity ratio $r_1 r_2$ was calculated according to Carman (C. J. Carman, R. A. Harrington and C. E. Wilkes, Macromolecules, 1977; 10, 536) as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP $mmT_{\beta\beta}$ (28.90-29.65 ppm) and the whole $T_{\beta\beta}$ (29.80-28.37 ppm).

Ethylene C2 content of component b2 has been measured by measuring the C2 content on component B) and then calculated by using the formula C2tot=Xb1C2b1+Xb2C2b2 wherein Xb1 and Xb2 are the amounts of components b1 and b2 in the composition.

Samples for the Mechanical Tests

Samples were obtained according to ISO 1873-2:2007.

Charpy impact test was determined according to ISO 179-leA, and ISO 1873-2

Elongation at yield: measured according to ISO 527.

Elongation at break: measured according To ISO 527

Stress at break: measured according to ISO 527.

Tensile Modulus according to ISO 527-2,

Melting Point and Crystallization Point

The melting point was measured by using a DSC instrument according to ISO 11357-3, at scanning rate of 20° C./min both in cooling and heating, on a sample of weight between 5 and 7 mg, under inert $N_2$ flow. Instrument calibration made with Indium.

EXAMPLES

Extrusion products and injection-molded articles were produced and assessed following ISO19069-2:2016, ISO294-1:2017 and ISO294-3:2002.

Materials
Recycled PP
Recycled PE

The POE component (c) used was Infuse 9077, which was commercially available from The Dow Chemical Company.

Component (d) was prepared according to example 4 of U.S. Pat. No. 6,586,531 B2

A stabilizer was talc, obtained via a 0.75 wt % TOSAF masterbatch.

An additive package contained a stabilizer mix (Irgafos 168/Irganox 1010), ZebraFlow T028 as a peroxide, and BYK4200 as stripping agent.

For comparative example 1, the same composition of example 1 was used, except component (d) was not used.

TABLE 1

| | Polymer composition of recycled PP (% wt) | | | | |
|---|---|---|---|---|---|
| Ex | rPP | rPE | POE | Comp. (d) | Additives |
| Ex 1 | 61 wt % | 18 | 9 | 6 wt % | 6% |
| C1 | " | " | " | — | " |

11

TABLE 2

| Properties of the final compositions | | | |
|---|---|---|---|
| | | Examples and comparative examples | |
| | | 1 | C1 |
| MFR, g/10 min | | 17 | 17 |
| Tensile Modulus, MPa | | 740 | 750 |
| Tensile Strength at yield, MPa | | 18.2 | 18 |
| Elongation at yield, % | | 12 | 13 |
| Tensile Strength at break, MPa | | 13 | 14 |
| Charpy kJ/m$^2$ | at 23° C. | 66 | 45 |
| | at 0° C. | — | |
| | at −20° C. | 9.6 | 8.2 |

The above data shows that the compositions of the present disclosure being based on a high amount of recycled material offer an improved impact/stiffness balance over the compositions of the prior art.

What is claimed is:

1. A polypropylene composition comprising:
(a) from 52 to 80 wt % of a recycled polypropylene (r-PP);
(b) from 8 to 30 wt % of a recycled polyethylene;
(c) from 4 to 20 wt % of a polyolefin elastomer (POE); and
(d) from 3 to 12 wt % of a composition comprising
  i) from 20 to 90 wt % of a crystalline polypropylene component containing
    A1) from 25 to 75 wt % of a fraction A1 having a melt flow rate MFR$^I$ of from 0.5 to 10 g/10 min., and
    A2) from 75 to 25 wt % of a fraction A2 having a melt flow rate MFR$^{II}$, wherein the ratio MFR$^{II}$/MFR$^I$ is from 30 to 2000 and fractions A1 and A2 are independently selected from the group consisting of a propylene homopolymer, a random copolymer of propylene containing up to 8 wt % of ethylene, and a random copolymer of propylene containing up to 8 wt % of a C$_4$-C$_{10}$ α-olefin; and
  ii) from 10 to 80 wt % of a copolymer component of ethylene and a C$_3$-C$_{10}$ α-olefin, wherein the copolymer contains from 10 to 70 wt % of ethylene, optionally contains minor amounts of a diene, is soluble in xylene at room temperature, and has an intrinsic viscosity measured in tetrahydronaphthalene at 135° C. [n] of from 4 to 9 dl/g,
wherein the polypropylene composition has a melt flow rate (ISO 1133 230° C./2.16 kg) ranging from 8.0 to 30.0 g/10 min. and the percentages of (a), (b), (c), and (d) being referred to the total weight of polypropylene composition.

2. The polypropylene composition according to claim 1, wherein:
component (a) ranges from 55 to 75 wt %;
component (b) ranges from 10 to 25 wt %;

12 component (c) ranges from 5 to 18 wt %; and
component (d) ranges from 4 to 10 wt %.

3. The polypropylene composition according to claim 1 has a melt flow rate (ISO 1133 230° C./2.16 kg) ranging from 10 to 25 g/10 min.

4. The polypropylene composition according to claim 1, wherein the recycled polyethylene (r-PE) component (b) has a density in the range of 0.94-0.97 g/cm$^3$ and is present between 10-25 wt %, based upon the total weight of the polypropylene composition.

5. The polypropylene composition according to claim 1, wherein component (c) is an ethylene-alpha-olefin copolymer selected from the group consisting of C$_2$-C$_4$ copolymers, C$_2$-C$_6$ copolymers, and C$_2$-C$_8$ copolymers, with an amount of ethylene ranging from 70 to 80 wt %, based upon the total weight of component (c).

6. The polypropylene composition according to claim 1, wherein component (c) has a density ranging from 0.85 to 0.89 g/cm$^3$ and a melt flow rate (190° C./2.16 Kg ISO 1133-1) from 0.3 to 1 g/10 min.

7. The polypropylene composition according to claim 1, wherein component (d) contains from 30 to 80 wt % of component (i), based upon the total weight of component (d), and the ratio MFR$^{II}$/MFR$^I$ ranges from 40 to 2000.

8. The polypropylene composition according to claim 1, wherein component (d) contains from 20 to 70 wt % of component (ii), based upon the total weight of component (d), and component (ii) has an intrinsic viscosity in tetrahydronaphthalene [n] at 135° C. of from 5 to 8 dl/g.

9. The polypropylene composition according to claim 1, wherein component (ii) has an ethylene content ranging from 15 to 60 wt %, based upon the total weight of component (ii).

10. The polypropylene composition according to claim 1, wherein the melt flow rate of component (d) ranges from 0.3 to 15 g/10 min.

11. The polypropylene composition according to claim 1, wherein component (d) is present in an amount ranging from 4 to 10 wt %, based upon the total weight of the polypropylene composition.

12. The polypropylene composition according to claim 1, further comprising a SEBS rubber as component (e) in an amount from 0.1 to 4 wt %, based on the total weight of the polypropylene composition.

13. The polypropylene composition according to claim 1 having a Charpy impact strength at 23°° C. ranging from 50-100 kJ/m$^2$, a tensile strength at yield equal to or higher than 15 MPa, an elongation at yield equal to or higher than 10%, and a tensile strength at break equal to or higher than 10 MPa.

14. An injection molded article made from the polypropylene composition according to claim 1.

* * * * *